(12) United States Patent
Bae et al.

(10) Patent No.: US 8,730,225 B2
(45) Date of Patent: May 20, 2014

(54) ELECTRO-WETTING DISPLAY DEVICE

(75) Inventors: Joo-Han Bae, Suwon-si (KR); Tae Hyung Hwang, Seoul (KR); JungWoo Park, Seoul (KR); Kyungtae Chae, Hwaseong-si (KR); Hyung-Il Jeon, Incheon (KR); Seok-Joon Hong, Seoul (KR)

(73) Assignee: Samsung Display Co., Ltd. (KR)

( * ) Notice: Subject to any disclaimer, the term of this patent is extended or adjusted under 35 U.S.C. 154(b) by 437 days.

(21) Appl. No.: 13/196,080

(22) Filed: Aug. 2, 2011

(65) Prior Publication Data

US 2012/0098812 A1    Apr. 26, 2012

(30) Foreign Application Priority Data

Oct. 26, 2010    (KR) .................. 10-2010-0104720

(51) Int. Cl.
*G06F 3/038*    (2013.01)
*G09G 5/00*    (2006.01)
*G09G 3/28*    (2013.01)
*G02B 26/00*    (2006.01)

(52) U.S. Cl.
USPC .............................. 345/211; 345/60; 359/292

(58) Field of Classification Search
USPC .......................................................... 345/211
See application file for complete search history.

(56) References Cited

U.S. PATENT DOCUMENTS

| 2010/0090930 | A1  | 4/2010  | Marcu et al. |
| 2010/0128341 | A1* | 5/2010  | Cheng et al. ................. 359/292 |
| 2011/0316764 | A1* | 12/2011 | Parry-Jones et al. ........... 345/60 |

FOREIGN PATENT DOCUMENTS

KR    1020060131240 A    12/2006

* cited by examiner

*Primary Examiner* — Charles V Hicks
(74) *Attorney, Agent, or Firm* — Cantor Colburn LLP

(57) ABSTRACT

An electro-wetting display device includes a polar fluid layer, a pixel electrode, a non-polar black fluid layer, a driving electrode, and a color fluid layer. The non-polar black fluid is deformed by a voltage difference between a voltage applied to the pixel electrode and a voltage applied to the polar fluid layer. the non-polar color fluid is deformed by a voltage difference between a voltage applied to the driving electrode and a voltage applied to the polar fluid layer. The driving electrode receives a voltage having a voltage level varied according to a display mode.

20 Claims, 18 Drawing Sheets

ELECTRO-WETTING DISPLAY DEVICE

This application claims priority to Korean Patent Application No. 10-2010-0104720 filed on Oct. 26, 2010, and all the benefits accruing therefrom under 35 U.S.C. §119, the contents of which are herein incorporated by reference in its entirety.

BACKGROUND OF THE INVENTION

1. Field of the Invention

The present invention relates to a reflective type electro-wetting display device.

2. Description of the Related Art

An electro-wetting phenomenon means a state where fluid is deformed or moved due to the variation of surface tension of the fluid, such state being caused by voltage applied to the fluid. A display device that performs a specific function using the electro-wetting phenomenon is called an electro-wetting display device.

The electro-wetting display device has various advantages, such as fast response speed, low driving voltage, thin thickness, etc., and thus it is extensively used for next-generation display products.

The electro-wetting display device is used in a reflection-type configuration, but it is difficult to increase the white brightness of the electro-wetting display device without exerting any influence on the color characteristics of the electro-wetting display device.

BRIEF SUMMARY OF THE INVENTION

Exemplary embodiments of the present invention provide a reflective type electro-wetting display device capable of increasing white brightness without deterioration of color characteristics thereof.

According to the exemplary embodiments, an electro-wetting display device includes a polar fluid layer, a pixel electrode, a non-polar black fluid layer, a reflecting layer, a driving electrode, and a non-polar color fluid layer. The electro-wetting display device may further include a first notch electrode and a second notch electrode, which are spaced apart from the pixel electrode.

The polar fluid layer receives a first voltage, and the pixel electrode is on a first substrate and receives a second voltage.

The non-polar black fluid is on the pixel electrode and contacts the polar fluid layer, and is lumped to one direction according to a movement of the polar fluid layer due to a voltage difference between the first voltage and the second voltage. The reflecting layer is between the black fluid and the first insulating substrate, and reflects an external incident light. A white color filter layer may be further between the reflecting layer and the pixel electrode.

The driving electrode is on a second substrate opposite to the first insulating substrate, and receives a third voltage. The third voltage has a voltage level varied according to a display mode. Particularly, the third voltage has the same voltage level as the first voltage in a color mode displaying images in color, and has an off-voltage level in a black and white mode displaying images in black and white color.

The non-polar color fluid is on the driving electrode and contacts the polar fluid layer, and is lumped to one direction according to a movement of the polar fluid layer due to a voltage difference between the first voltage and the third voltage.

According to the above, the color fluid entirely covers a pixel area in the color mode, thereby displaying the images in color. In addition, the color fluid exists only overlapping the second notch electrode in the black and white mode, so that brightness of white color may be increased since the lights reflected by the reflecting layer do not pass through the color fluid layer.

In addition, a white color filter layer is further disposed between the reflecting layer and the pixel electrode, and thus the brightness of the white color may be increased since a user perceives the white color without relating to the color of the external light in the black and white mode.

According to an exemplary embodiment of a method of displaying images in an electro-wetting display device, the method includes applying a first voltage to a first notch electrode, a second notch electrode and a polar fluid layer, applying a second voltage to a pixel electrode, and applying a third voltage to a driving electrode. When a voltage difference is generated between the pixel electrode and the polar fluid layer, a non-polar color fluid entirely covers a pixel area, and a reflecting layer is exposed and reflects external incident light to the non-polar color fluid layer, thereby displaying a color light in a color display mode. When the third voltage is an off-voltage level, and the voltage difference is generated between the pixel electrode and the polar fluid layer, the non-polar color fluid is lumped to one side of the pixel area, and the reflecting layer is exposed and reflects the external incident light, thereby displaying a white color in the black and white mode.

BRIEF DESCRIPTION OF THE DRAWINGS

The above and other advantages of the present invention will become readily apparent by reference to the following detailed description when considered in conjunction with the accompanying drawings in which.

DETAILED DESCRIPTION OF THE INVENTION

Figure 1:
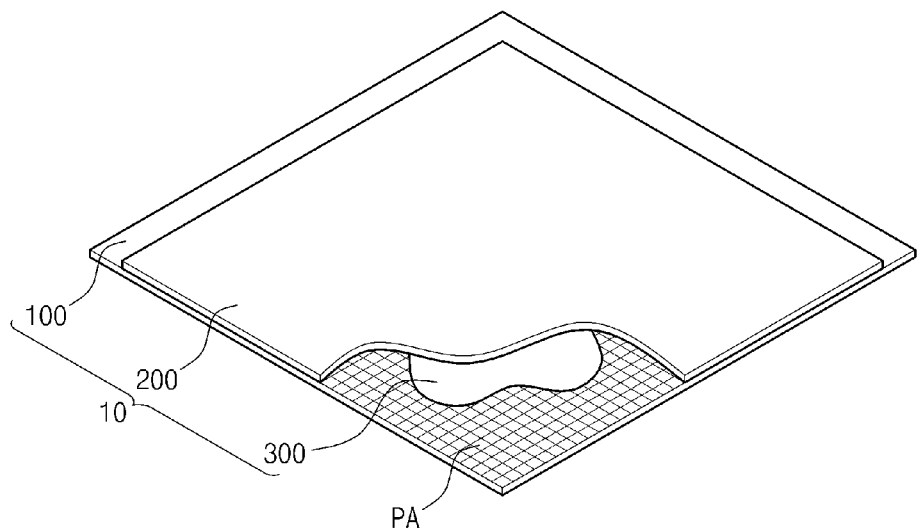
FIG. 1 is a perspective view showing an exemplary embodiment of an electro-wetting display device, according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Hereinafter, the present invention will be explained in detail with reference to the accompanying drawings.

FIG. 1 is a perspective view showing an exemplary embodiment of an electro-wetting display device, according to the present invention.

Referring to FIG. 1, the electro-wetting display device 10 includes a first substrate 100 including a pixel area PA, a second substrate 200 facing the first substrate 100, and a polar fluid layer 300 interposed between the first substrate 100 and the second substrate 200. The polar fluid layer 300 includes a liquid composition having a polarity. In one exemplary embodiment, the polar fluid layer 300 may be water ($H_2O$). The electro-wetting display device 10 may include a plurality of pixel areas PA.

Figure 2:
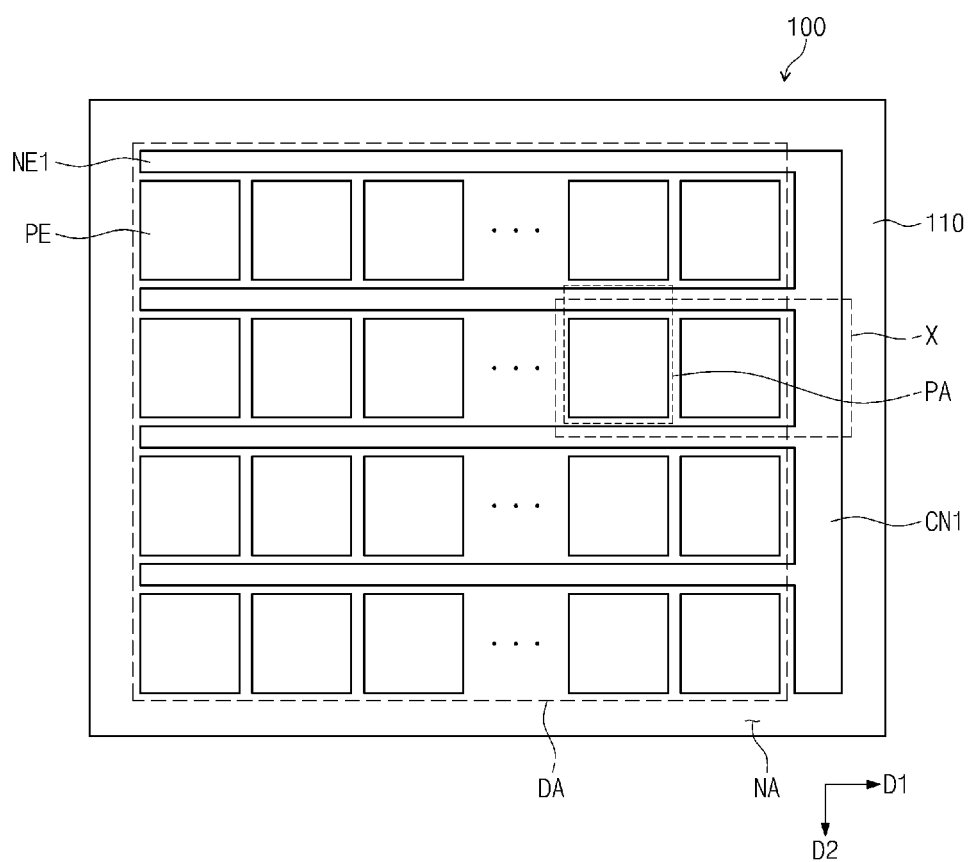
FIG. 2 is a plan view showing an exemplary embodiment of an arrangement of electrodes on an upper substrate of FIG. 1.
Figure 3:
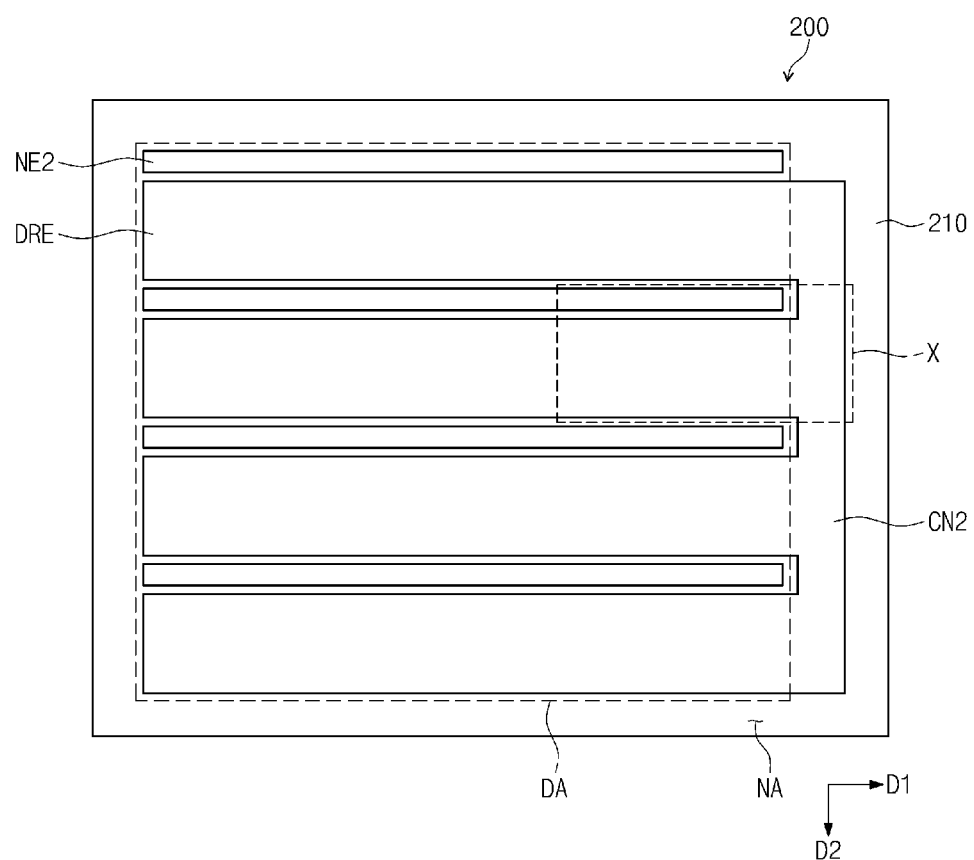
FIG. 3 is a plan view showing an exemplary embodiment of an arrangement of electrodes on a lower substrate of FIG. 1.
Figure 4:
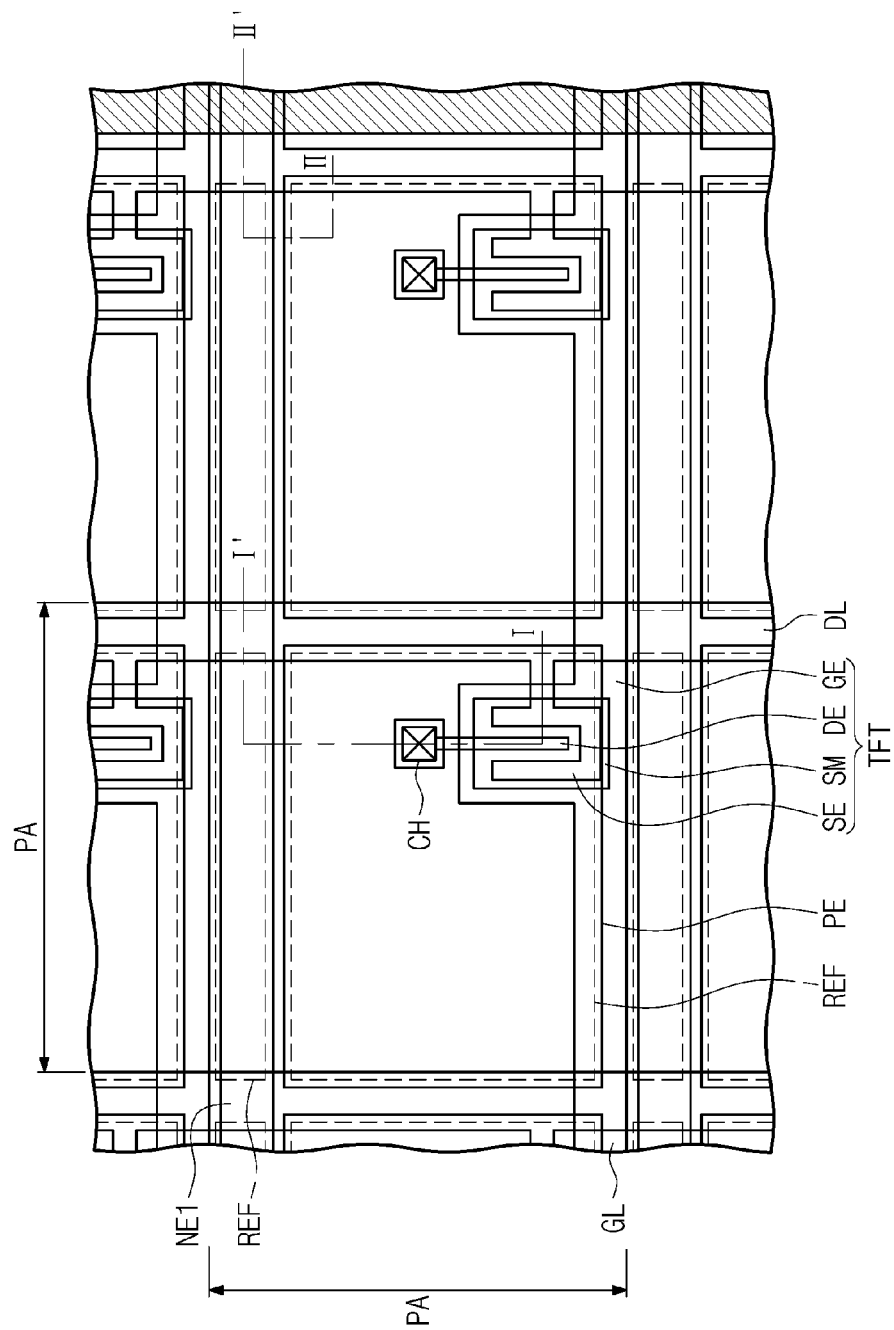
FIG. 4 is a partially enlarged plan view showing an exemplary embodiment of a portion of the electro-wetting display device of FIG. 1.
Figure 5:
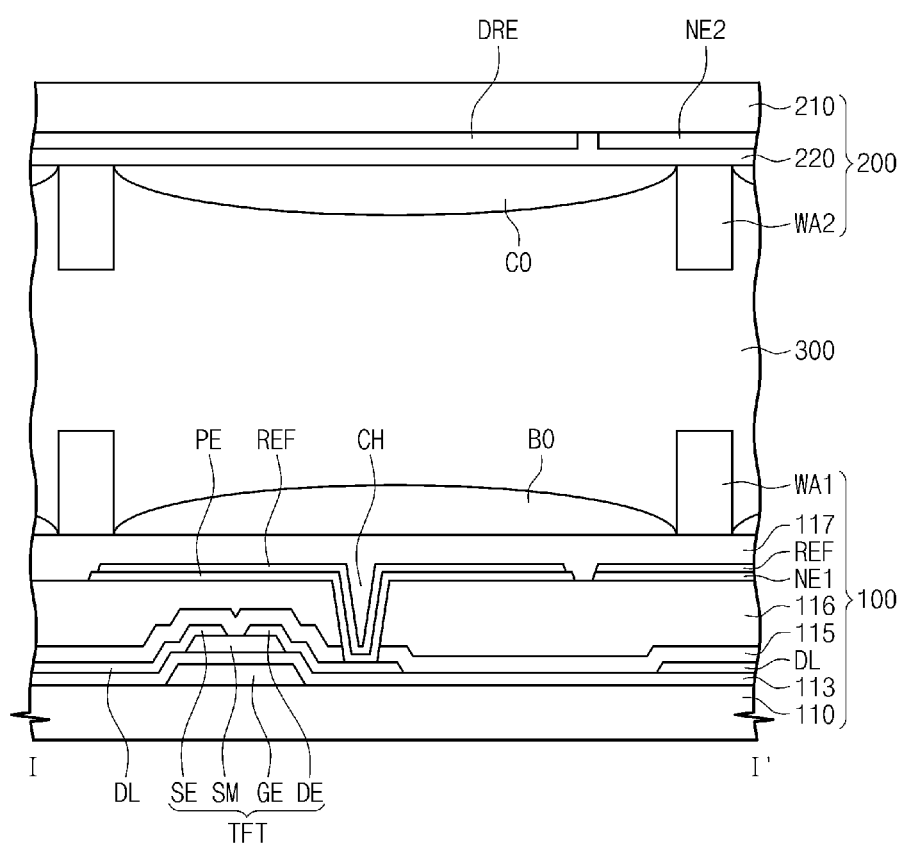
FIG. 5 is a cross-sectional view taken along line I-I' of FIG. 4.

FIG. 2 is a plan view showing an exemplary embodiment of an arrangement of electrodes on an upper substrate of FIG. 1, FIG. 3 is a plan view showing an exemplary embodiment of an arrangement of electrodes on a lower substrate of FIG. 1, FIG. 4 is a partially enlarged plan view showing an exemplary embodiment of a portion of the electro-wetting display device of FIG. 1, and FIG. 5 is a cross-sectional view taken along line I-I' of FIG. 4.

Referring to FIGS. 2, 4, and 5, the first substrate 100 includes a display area DA and a non-display area NA. In addition, the first substrate 100 includes a first substrate 110, a plurality of pixel electrodes PE disposed on the first substrate 110, and a plurality of notch electrodes NE1 disposed on the first substrate 110. The display area DA includes a plurality of pixel areas PA arranged therein. In the illustrated exemplary embodiment, the pixel areas PA have the same structure and function, and thus one pixel area PA will be described in detail as a representative example.

In an exemplary embodiment, each pixel area PA includes a gate line GL, a data line DL, a pixel electrode PE, a reflecting layer REF, a thin film transistor TFT, and a black fluid BO, which are disposed on the first substrate 110.

The gate line GL extends in a first direction D1, and the data line DL extends in a second direction D2 to cross the gate line GL. The gate line GL and the data line DL are electrically insulated from each other by a first insulating layer 113 disposed between the gate line GL and the data line DL.

The thin film transistor TFT is positioned adjacent to a cross point of the gate line GL and the data line DL in the plan view, and includes a gate electrode GE, a semiconductor layer SM, a source electrode SE, and a drain electrode DE.

The gate electrode GE is branched from the gate line GL, and the semiconductor layer SM is disposed on the first insulating layer 113 to overlap with the gate electrode GE. The source electrode SE is branched from the data line DL, and overlaps with a portion of the semiconductor layer SM. The drain electrode DE is spaced apart from the source electrode SE and overlaps with a portion of the semiconductor layer SM when viewed in a plan view. The semiconductor layer SM serves as a conductive channel between the source electrode SE and the drain electrode DE.

A second insulating layer 115 is disposed on the first insulating layer 113 to cover an entire of the source electrode SE and the drain electrode DE. The second insulating layer 115 is provided with a contact hole CH formed extending through a thickness thereof, to expose a portion of the drain electrode DE, and the pixel electrode PE is physically and/or electrically connected to the drain electrode DE through the contact hole CH.

An organic layer 116 is disposed on the second insulating layer 115 and provided with a contact hole corresponding to (e.g., aligned with) the contact hole CH of the second insulating layer 115. The pixel electrode PE and the first notch electrode NE1 are disposed on the organic layer 116, and the first notch electrodes NE1 are spaced apart from the pixel electrodes PE.

The first notch electrodes NE1 are longitudinally extended in the first direction D1, and are arranged in the second direction D2. The pixel electrodes PE are arranged in the first direction D1, and alternately arranged with the first notch electrodes NE1 in the second direction D2. First ends of the first notch electrodes NE1 are connected to each other by a first connecting portion CN1 longitudinally extended in the second direction D2. The first notch electrodes NE1 receive a voltage different from a voltage applied to the pixel electrodes PE to control a flowing direction of the black fluid BO. Each of the first notch electrodes NE1 exclusive of the first connecting portion CN1, is a single unitary indivisible member. The first notch electrodes NE1, together with the first connecting portion CN1, forms a single unitary indivisible element.

For the convenience of explanation, four first notch electrodes NE1 have been shown in FIG. 2, but the invention is not limited thereto or thereby. That is, the number of the pixel electrodes PE and the number of the first notch electrodes NE1 may be varied according to a resolution of the electro-wetting display device.

The reflecting layer REF is disposed on the pixel electrodes PE and the first notch electrodes NE1. The reflecting layer REF may include a metal material such as aluminum (Al). The reflecting layer REF is exposed according to a variation of the surface area of the black fluid BO to reflect an external light incident to the display device 10.

A first hydrophobic insulating layer 117 is disposed on the reflecting layer REF. In one exemplary embodiment, the first hydrophobic insulating layer 117 is formed by forming an insulating layer, and coating the insulating layer with a hydrophobic material. The hydrophobic material may be coated over the insulating layer by using a spin coating method or an inkjet spray method.

First barrier walls WA1 are disposed on the first hydrophobic insulating layer 117 and positioned at an end (e.g., edge) portion of each pixel area PA. Although not shown in figures, the first barrier walls WA1 may have a planar shape completely surrounding each pixel area PA, and may overlap with the gate line GL and the data line DL. In one exemplary embodiment, each of the first barrier walls WA1 may have a width larger than a width of at least one of the gate line GL and the data line DL, the widths being taken in the second and first directions D2 and D1, respectively. The contact area between the first barrier walls WA1 and other elements may be changed according to a pixel design and a process margin.

In addition, since a black oil of the black fluid BO of one pixel area PA does not infiltrate into the pixel area PA adjacent thereto even when the black fluid BO covers the pixel electrode PE and the first notch electrode NE1, or when the black fluid BO is lumped only on the first notch electrode NE1, each of the first barrier walls WA1 has a height larger than a height of the lumped black fluid BO. The height is taken in a direction perpendicular to the plane defined by the first and second directions D1 and D2, or perpendicular to a plane of the first substrate 110. The height of the black fluid BO may also be a maximum distance the black fluid BO protrudes from a reference point, such as an upper surface of the first hydrophobic layer 117.

The black fluid BO is in areas defined by the first barrier walls WA1. The black fluid BO includes a non-polar fluid, and thus the black fluid BO has a high chemical attraction to the surface of a hydrophobic material when compared with the polar fluid. The black fluid BO may include the black oil obtained by coloring decane ($C_{10}H_{22}$) with a non-polar dye. In one exemplary embodiment, the black fluid BO may be formed by spraying the black oil on the hydrophobic insulating layer 117 in the polar fluid while the first substrate 100 is dipped into the polar fluid such as water. As described above, the black fluid BO makes contact with the polar fluid layer 300.

Referring to FIGS. 3, 4, and 5, the second substrate 200 includes a second substrate 210 facing the first substrate 110. The second substrate 210 includes driving electrodes DRE, second notch electrodes NE2, a color fluid CO, and second barrier walls WA2.

The second notch electrodes NE2 are longitudinally extended in the first direction D1, and disposed on the second insulating layer 210 to correspond to (e.g., overlap or align with in the plan view) the first notch electrodes NE1, respectively. The second notch electrodes NE2 of the second substrate 200 are connected to the first notch electrodes NE1 of the first substrate 100 by connecting electrodes in one-to-one correspondence. In addition, the second notch electrodes NE2 control a flowing direction of the color fluid CO.

The driving electrodes DRE are longitudinally extended in the first direction D1, and alternately arranged with the second notch electrodes NE2 in the second direction D2 while being spaced apart from the second notch electrodes NE2. First ends of the driving electrodes DRE are connected to each other by a second connecting portion CN2 longitudinally extended in the second direction D2. Each of the driving electrodes DRE exclusive of the second connecting portion CN2, is a single unitary indivisible member. A single driving electrode DRE may overlap more than one pixel electrode PE. The driving electrodes DRE, together with the second connecting portion CN2, forms a single unitary indivisible element.

In FIG. 3, four second notch electrodes NE2 and four driving electrodes DRE have been shown, but the invention is not limited thereto or thereby. That is, the number of the driving electrodes DRE and the number of the second notch electrodes NE2 may be varied according to the resolution of the electro-wetting display device.

A second hydrophobic insulating layer 220 is disposed on the second notch electrodes NE2 and the driving electrodes DRE. In one exemplary embodiment, the second hydrophobic insulating layer 220 is formed by forming an insulating layer and coating the insulating layer with a hydrophobic material. The hydrophobic material may be coated over the insulating layer by using a spin coating method or an inkjet spray method.

Second barrier walls WA2 are disposed on the second hydrophobic insulating layer 220 and positioned at an end (e.g., edge) portion of each pixel area PA. In addition, the second barrier walls WA2 may be positioned at positions respectively corresponding to, aligned with and/or overlapping the first barrier walls WA1. Although not shown in figures, the second barrier walls WA2 may have a planar shape completely surrounding each pixel area PA, and may overlap with the gate line GL and the data line DL in a plan view. In addition, each of the second barrier walls WA1 may have a width larger than a width of at least one of the gate line GL and the data line DL.

In addition, although not shown in figures, the second barrier walls WA2 may be longitudinally extended only in a direction substantially parallel to the data line DL. The second barrier walls WA2 may be overlapped with the data line DL and have a width larger than the data line DL.

Further, since a color oil of the color fluid CO of one pixel area PA does not infiltrate into the pixel area PA adjacent thereto even when the color fluid CO covers the driving electrode DRE and the second notch electrode NE2, or when the color fluid CO is lumped, each of the second barrier walls WA2 has a height higher than a height when the color fluid CO is lumped. The height is taken in a direction perpendicular to the plane defined by the first and second directions D1 and D2, or perpendicular to a plane of the second substrate 210. The height of the color fluid CO may also be a maximum distance the color fluid BO protrudes from a reference point, such as a lower surface of the second hydrophobic insulating layer 220.

The color fluid CO includes a red color fluid layer, a green color fluid layer, and a blue color fluid layer. The red, green, and blue color fluid layers are disposed in areas defined by the second barrier walls WA2 in one-to-one correspondence. Similar to the black fluid BO, the red, green, and blue color fluid layers are in the areas defined by the second barrier walls WA2. In the case that the second barrier walls WA2 are extended only in the direction substantially parallel to the data line DL, the color fluid CO may be filled in (e.g., overlap) plural pixel areas PA, alternative to the red, green, and blue color fluid layers being filled in every pixel PA.

Figure 6:
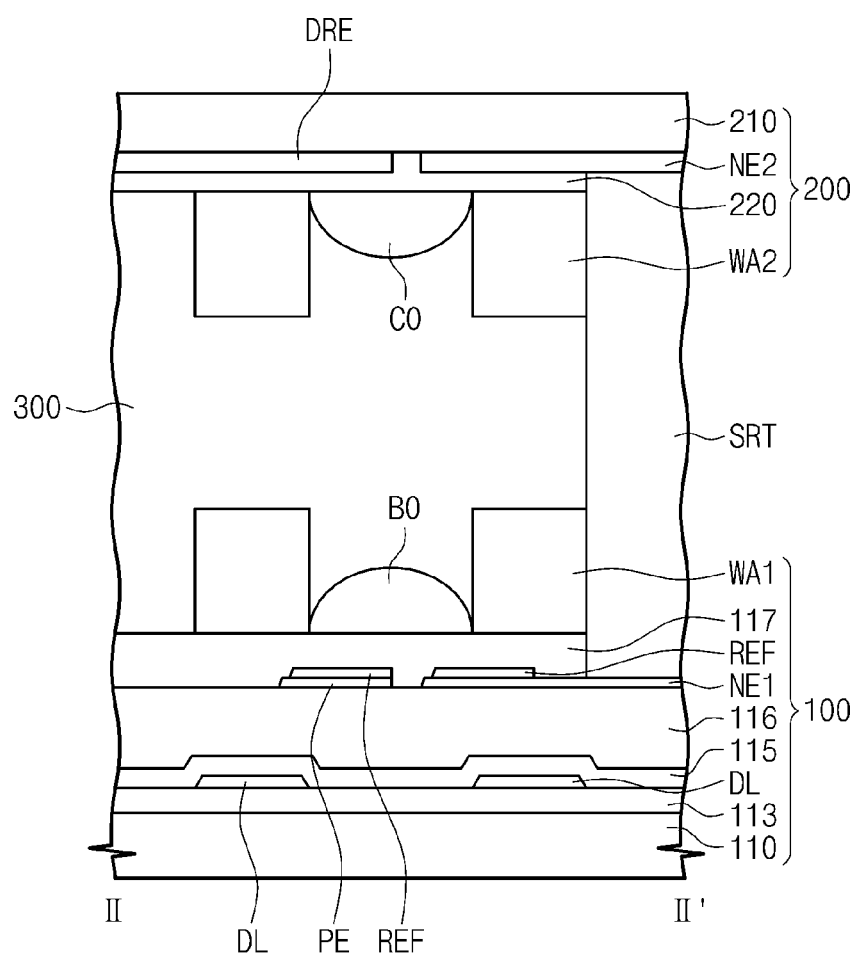
FIG. 6 is a cross-sectional view taken along line II-II' of FIG. 4.

FIG. 6 is a cross-sectional view taken along line II-II' of FIG. 4.

Referring to FIG. 6, the electro-wetting display device includes a plurality of connecting electrodes SRT to connect the second notch electrodes NE2 and the first notch electrodes NE1 in one-to-one correspondence, to each other. The number of the connecting electrodes SRT is the same as the number of the second notch electrodes NE2.

Although not shown in figures, the connecting electrodes SRT are disposed between the first and second substrates 100 and 200. In detail, the connecting electrodes SRT are disposed between the first notch electrode NE1 and the second notch electrode NE2, and exposed to the polar fluid layer 300.

Hereinafter, an operation of the electro-wetting display device will be described in detail with reference to FIGS. 7 to 12.

Figure 9:
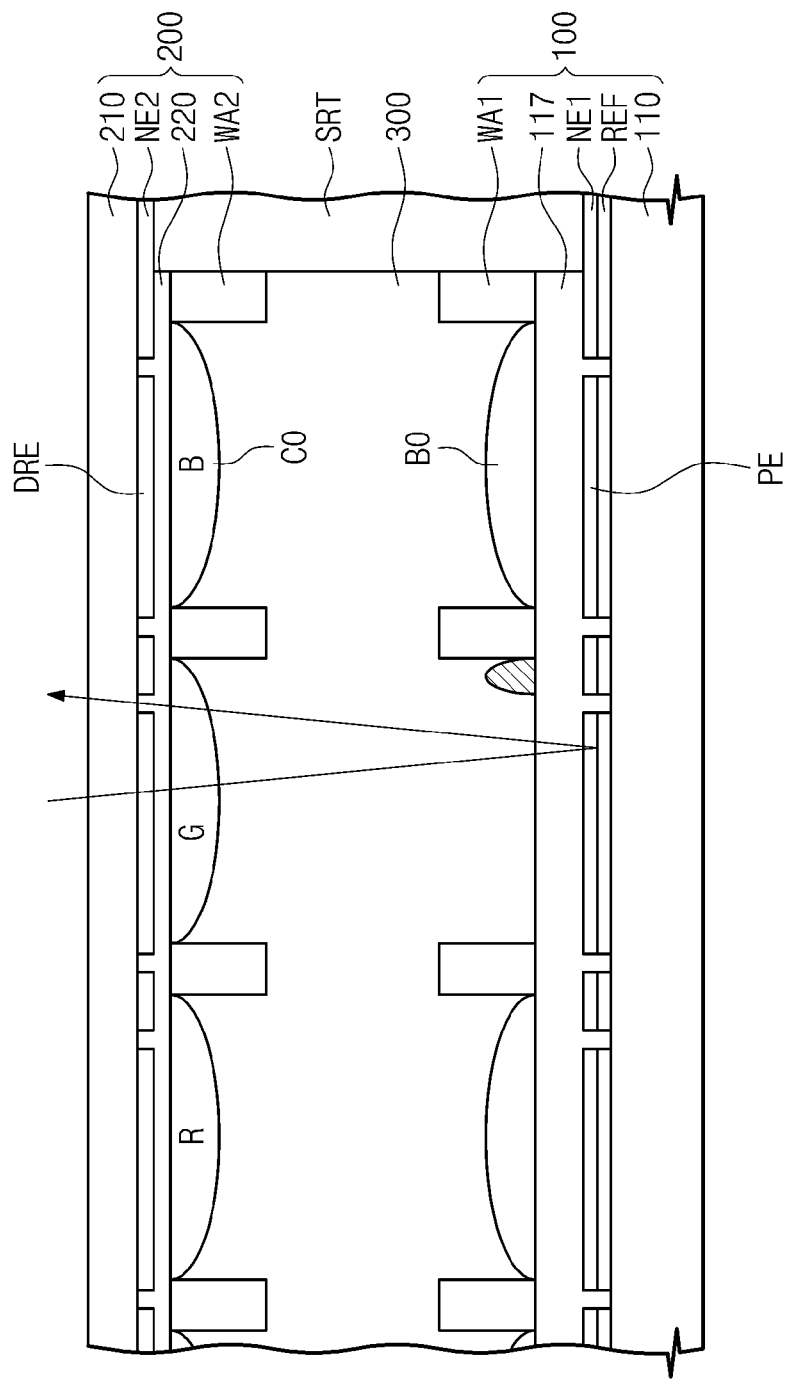
Figure 10:
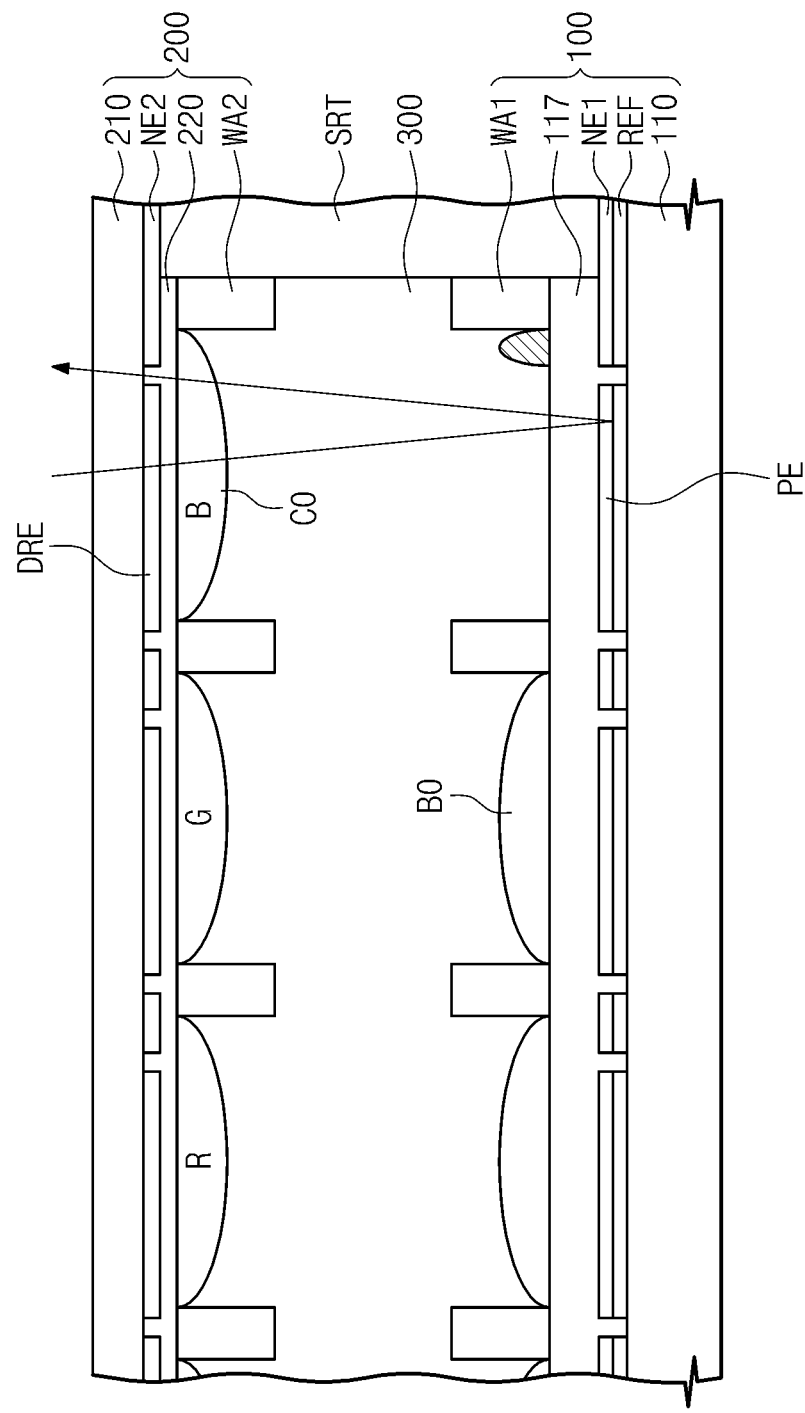
Figure 11:
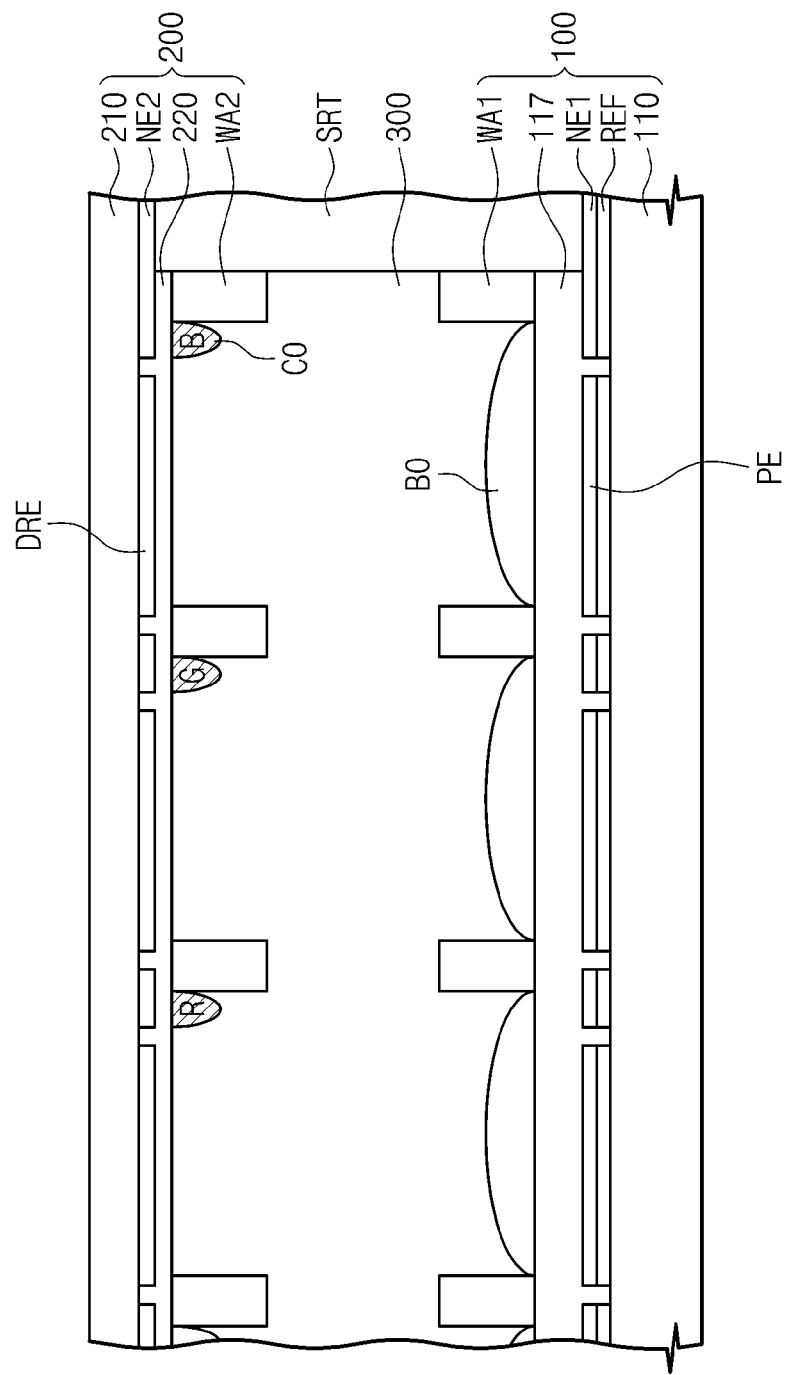
FIGS. 11 and 12 are cross-sectional views showing an exemplary embodiment of an operation of an electro-wetting display device in a black and white mode.
Figure 12:
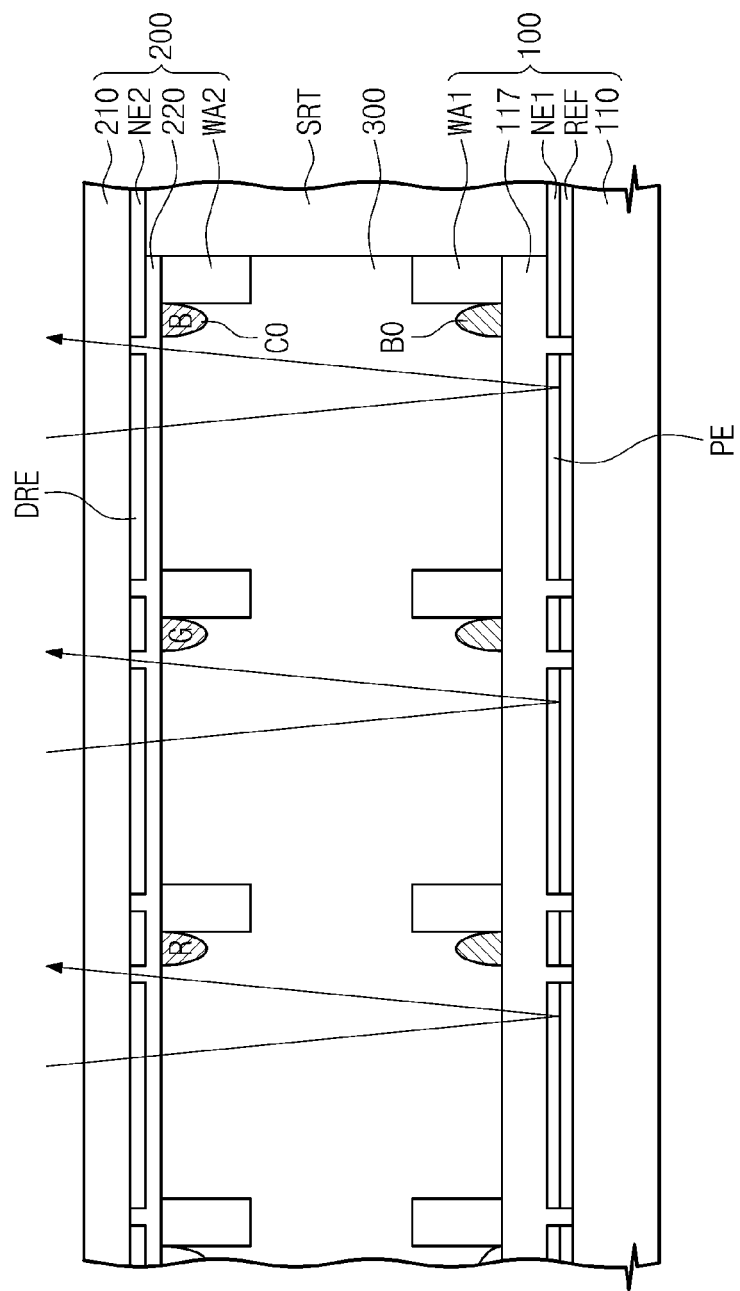

FIGS. 7 to 10 are cross-sectional views showing an exemplary embodiment of an operation of an electro-wetting display device in a color mode, and FIGS. 11 and 12 are cross-sectional views showing an exemplary embodiment of an operation of an electro-wetting display device in a black and white mode. For the convenience of explanation, three pixel areas including the red color fluid R, the green color fluid G, and the blue color fluid B, respectively, and the connecting electrode SRT have been shown in FIGS. 7 to 12. In addition, although not shown in FIGS. 7 to 12, each pixel area may include the thin film transistor.

The electro-wetting display device is operated in a color mode displaying images in color, or in a black and white mode displaying images in black and white, according to the voltage applied to the driving electrodes DRE. In the color mode, the voltage applied to the driving electrodes DRE has the same voltage level as the voltage applied to the polar fluid layer 300. In the black and white mode, the driving electrodes DRE receive a third voltage having an off-voltage level.

Figure 7:
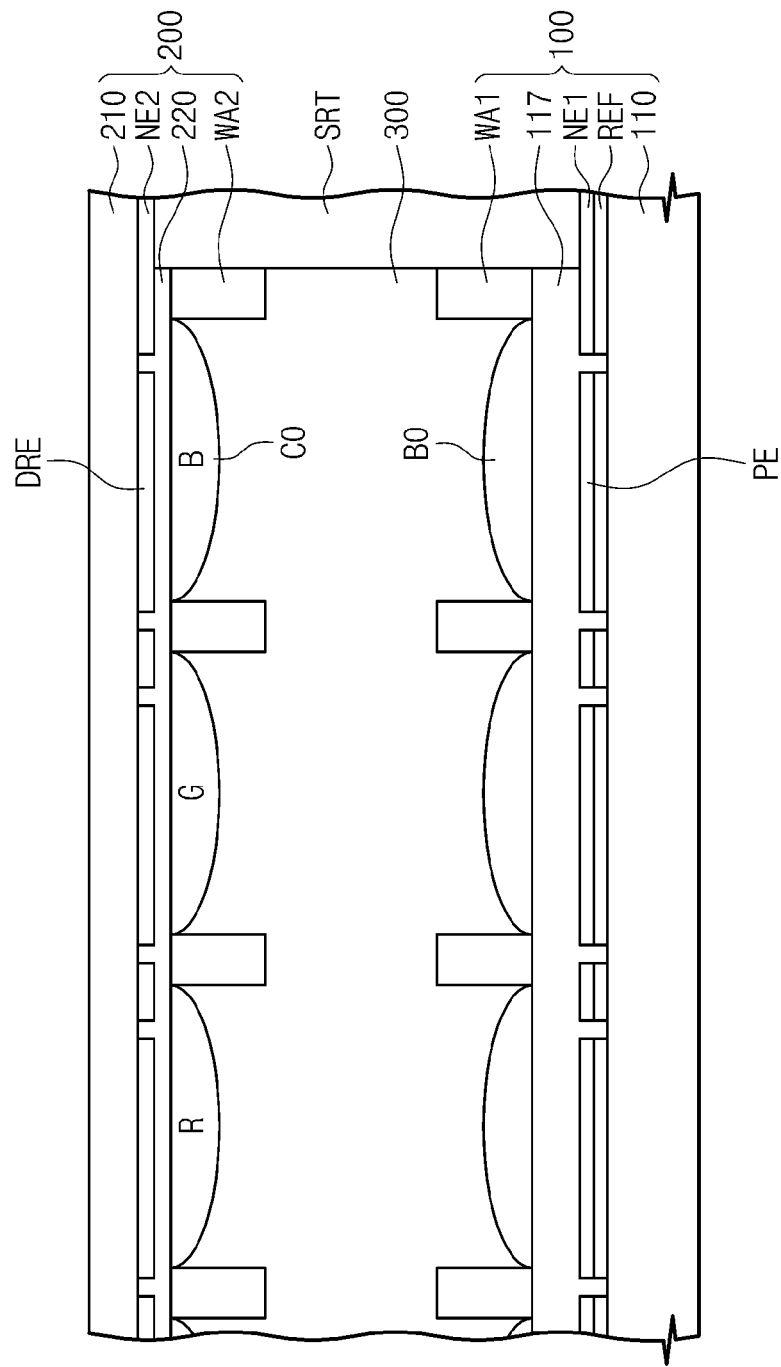
FIGS. 7 to 10 are cross-sectional views showing an exemplary embodiment of an operation of an electro-wetting display device in a color mode.

FIG. 7 shows the electro-wetting display device operated in the color mode.

Referring to FIG. 7, the first and second notch electrodes NE1 and NE2 receive a first voltage. Since the connecting electrode SRT connects the first notch electrode NE1 to the second notch electrode NE2, the connecting electrode SRT receives the first voltage. In addition, the connecting electrode SRT is exposed to the polar fluid layer 300, and thus the polar fluid layer 300 receives the first voltage through the connecting electrode SRT.

In the color mode, the driving electrode DRE receives the third voltage having the same voltage level as the first voltage. Accordingly, since a voltage difference between the driving electrode DRE and the polar fluid layer 300 does not exist, the color fluid CO in each pixel area is maintained in a state that the color fluid CO entirely covers the driving electrode DRE and the second notch electrode NE2.

The pixel electrodes PE receive a second voltage having the same voltage level as the first voltage. Thus, a voltage difference between the polar fluid layer 300 and the pixel electrodes PE does not exist, and thus the black fluid BO in each pixel area is maintained in a state that the black fluid BO entirely covers the pixel electrodes PE and the first notch electrode NE1, while being maintained to cover an entire upper surface of the reflecting layer REF. Thus, no light exists to be perceived to user, and the user perceives the black color.

Figure 8:
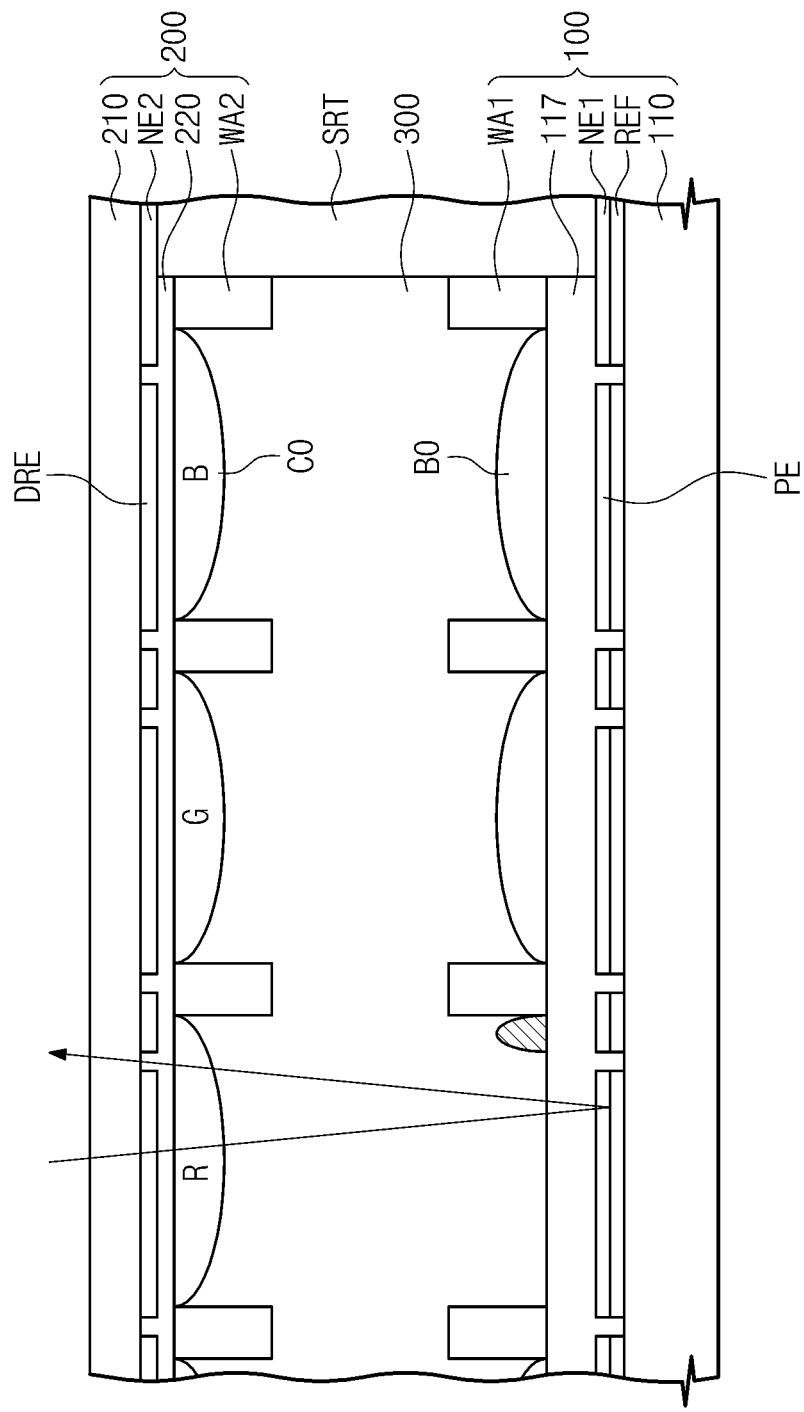

FIGS. 8 to 10 show the electro-wetting display device that displays red, green, and blue colors, respectively, in the color mode.

Referring to FIG. 8, the first notch electrode NE1, the second notch electrode NE2, and the polar fluid layer 300 receive the first voltage. In addition, the driving electrode DRE receives the third voltage having the same voltage level as the first voltage, and the color fluid CO in each pixel area is maintained in the state that the color fluid CO entirely covers the driving electrode DRE and the second notch electrode NE2.

The pixel electrode PE arranged in the pixel area including the red color fluid R receives the second voltage having the voltage level different from the first voltage.

Accordingly, the voltage difference occurs between the polar fluid layer 300 and the pixel electrode PE. Since polar fluid molecules in the polar fluid layer 300 have polarity, the polar fluid molecules move to the pixel area PA in which the voltage difference occurs regardless of a low chemical attraction of the polar fluid molecules to the surface of the first hydrophobic insulating layer 117.

Although the portion of the polar fluid layer 300, which moves to the pixel area PA in which the voltage difference occurs, has the polarity, the black fluid BO on the pixel electrode PE is pushed by the polar fluid molecules since the black fluid BO is non-polar and the surface energy of the polar fluid molecules of the polar fluid layer 300 is different from that of the black fluid BO. However, since the voltage level of the voltage applied to the first notch electrode NE1 is the same as the voltage level of the voltage applied to the polar fluid layer 300, the voltage difference does not occur in the area in which the first notch electrode NE1 is formed. Accordingly, the black fluid BO exists only in the area in which the first notch electrode NE1 is formed, so that a portion of the reflecting layer REF is exposed.

A portion of the external light reflected by the reflecting layer REF (illustrated by the arrowed line in FIG. 8) passes through the red color fluid R, so that the user may perceive the red color at a viewing side of the display device 10.

In addition, as the voltage difference between the first voltage and the second voltage increases, the number of the polar fluid molecules that are moving to the pixel area PA increases. Thus, the black fluid BO may be more pushed to the area in which the first notch electrode NE1 is disposed. As a result, the reflecting layer REF is further exposed, thereby displaying bright gray scale. In other words, the electro-wetting display device may display various gray scales by controlling the voltage level of the voltage applied to the pixel electrode PE.

Referring to FIG. 9, the first notch electrode NE1, the second notch electrode NE2, and the polar fluid layer 300 receive the first voltage. In addition, the driving electrode DRE receives the third voltage having the same voltage level as the first voltage, and the color fluid CO in each pixel area PA is maintained in a state that the color fluid CO covers the entire surface of the driving electrode DRE and the second notch electrode NE2.

When the second voltage having the voltage level different from the first voltage is applied to the pixel electrode PE arranged in the pixel area including the green color fluid G, the polar fluid molecules move according to the voltage difference between the first voltage and the second voltage, so the black fluid BO exists only on the area in which the first notch electrode NE1. Accordingly, the portion of the external light reflected by the reflecting layer REF passes through the green color fluid G, and thus the user may perceive the green color. In FIG. 10, the electro-wetting display device displays the blue color through the processes similar to those shown in FIGS. 8 and 9.

In FIGS. 8 to 10, the electro-wetting display device that displays one color has been described, but the invention is not limited thereto. That is, the electro-wetting display device may display various colors.

FIG. 11 shows the electro-wetting display device that displays the black color, in the black and white mode.

Referring to FIG. 11, the polar fluid layer 300, the first notch electrode NE1, and the second notch electrode NE2 receive the first voltage.

In the black and white mode, the third voltage having the off-voltage level is applied to the driving electrode DRE. Accordingly, the voltage difference occurs between the third voltage applied to the driving electrode DRE and the first voltage applied to the polar fluid layer 300. Since the polar fluid molecules in the polar fluid layer 300 have polarity, the polar fluid molecules move to the pixel area PA in which the voltage difference occurs regardless of the low chemical attraction of the polar fluid molecules to the surface of the second hydrophobic insulating layer 220. In this case, although the portion of the polar fluid layer 300, which moves to the pixel area PA in which the voltage difference occurs, has the polarity, the color fluid CO on the driving electrode DRE is pushed by the polar fluid molecules since the color fluid CO is non-polar and the surface energy of the polar fluid molecules of the polar fluid layer 300 is different from that of the color fluid CO. As a result, the color fluid CO is lumped on the area in which the second notch electrode NE2 is formed.

Each of the pixel electrodes PE receives the second voltage having the same voltage level as the first voltage. Thus, no voltage difference exists between the pixel electrodes PE and the polar fluid layer 300, and the black fluid BO in each pixel area PA is maintained in a state that the black fluid BO covers the pixel electrode PE and the first notch electrode NE1. That is, since the black fluid BO is maintained in a state that the black fluid BO covers the reflecting layer REF and no light exists to be perceived to the user, the user perceives the black color.

FIG. 12 shows the electro-wetting display device that displays the white color, in the black and white mode.

Referring to FIG. 12, the polar fluid layer 300, the first notch electrode NE1, and the second notch electrode NE2 receive the first voltage, and the driving electrode DRE receives the third voltage having the off-voltage level. Thus, the color fluid CO is lumped in the area in which the second notch electrode NE2 is disposed.

Each of the pixel electrodes PE respectively arranged in three pixel areas receive the second voltage different from the first voltage. Accordingly, the voltage difference occurs between the polar fluid layer 300 and the pixel electrodes PE, and the polar fluid molecules of the polar fluid layer 300 move to the pixel area PA in which the voltage difference occurs.

Since the portion of the polar fluid layer 300 that are moving to the pixel area PA has a polarity different from that of the black fluid BO, the black fluid BO existing on the pixel electrodes PE is pushed by the polar fluid molecules, so that the black fluid BO is lumped to the area in which the first notch electrode NE1 is disposed. As a result, the reflecting layer REF once completely covered by the black fluid BO (FIG. 11), is partially exposed.

As described above, since the color fluid CO exists only on the area in which the second notch electrode NE2 is disposed, most of the external light reflected by the reflecting layer REF passes through the second substrate 200, and not through a color fluid CO. Therefore, the user may perceive the white color.

In FIG. 12, each of the pixel electrodes PE respectively arranged in the three pixel areas receive the second voltage having the constant voltage level different from the first voltage, but the invention is not limited thereto or thereby. That is, the pixel electrodes PE may receive the second voltage having different voltage levels from each other, such that portions of the black fluid BO of the three pixel areas are selectively lumped to selectively expose portions of the reflecting layer REF in the three pixel areas.

According to the above, the color fluid CO exists only on the area in which the second notch electrode NE2 is disposed, in the black and white mode. In addition, when the white color is displayed, most of the external light reflected by the reflecting layer REF do not pass through the color fluid CO, thereby increasing the brightness of the white color.

Figure 13:
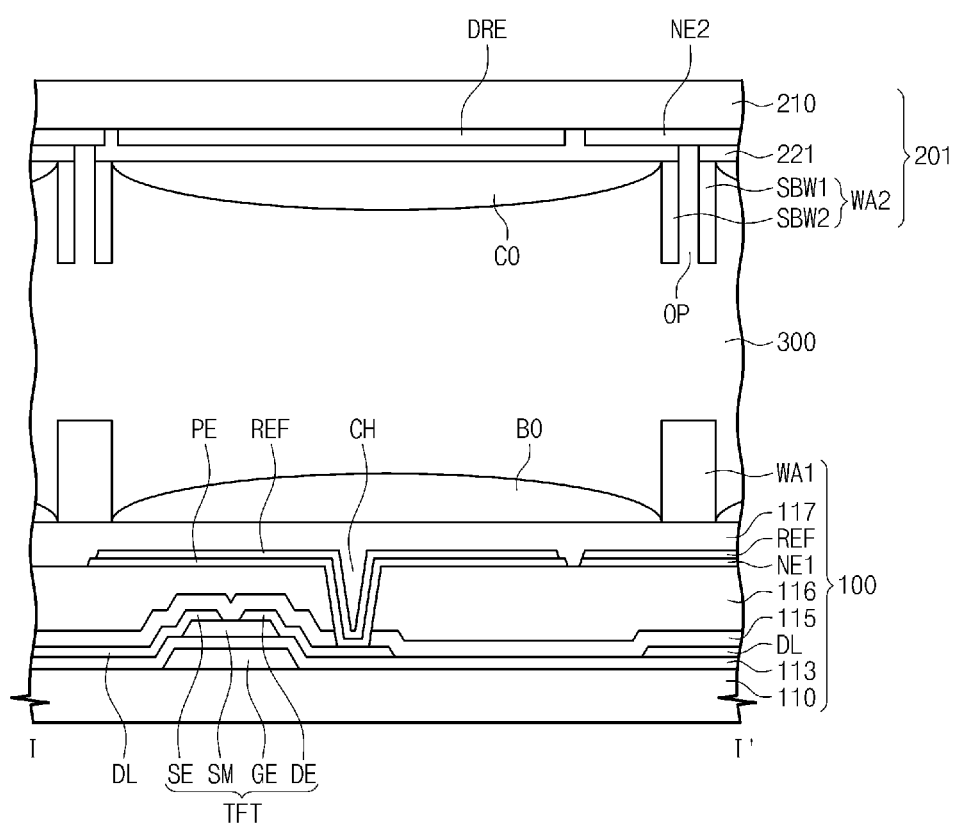
FIG. 13 is a cross-sectional view showing another exemplary embodiment of an electro-wetting display device, according to the present invention.

FIG. 13 is a cross-sectional view showing another exemplary embodiment of an electro-wetting display device, according to the present invention. In the exemplary embodiment of FIG. 13, the same reference numerals denote the same elements in FIGS. 1-12, and thus detailed description of the same elements will be omitted.

Similar to the electro-wetting display device in FIGS. 1-12, the electro-wetting display device in FIG. 13 includes a first substrate 100, a second substrate 201, and a polar fluid layer 300. The first substrate 100 has the same structure and function as the first substrate in FIGS. 1-12, so details thereof will be herein omitted.

The second substrate 201 includes driving electrodes DRE, second notch electrodes NE2, second hydrophobic insulating layer 221, and second barrier walls WA2.

The second hydrophobic insulating layer 221 is disposed on the driving electrodes DRE and the second notch electrodes NE2. The second hydrophobic insulating layer 221 is provided with openings OP through which portions of the second notch electrodes NE2 are exposed, respectively. Each of the second notch electrodes NE2 is exposed to the polar fluid layer 300 through a corresponding opening of the openings OP. Accordingly, different from the polar fluid layer 300 receiving the first voltage through the connecting electrode SRT in FIGS. 1-12, the polar fluid layer 300 directly receives the first voltage through the second notch electrodes NE2.

Each of the second barrier walls WA2 includes a first sub-barrier wall SBW1 and a second sub-barrier wall SBW2. The first and second sub-barrier walls SBW1 and SBW2 are spaced apart from each other while interposing the opening OP therebetween. In one exemplary embodiment, the first sub-barrier wall SBW1 is spaced apart from the driving electrode DRE, and the second sub-barrier wall SBW2 is closer to the driving electrode DRE than the first sub-barrier wall SBW1. The color fluid CO is on the second hydrophobic insulating layer 221 except for the area corresponding to the opening OP.

According to the above, the electro-wetting display device applies the first voltage directly to the polar fluid layer 300 through the second notch electrode NE2, so that no additional electrode is required to apply the voltage to the polar fluid layer 300, due to the openings OP extended completely through a thickness of the second hydrophobic layer 221 to expose portions of the second notch electrode NE2. Thus, the manufacturing processes for the electro-wetting display device in FIG. 13 may be simplified when compared with the electro-wetting display device described in FIGS. 1-12.

Figure 14:
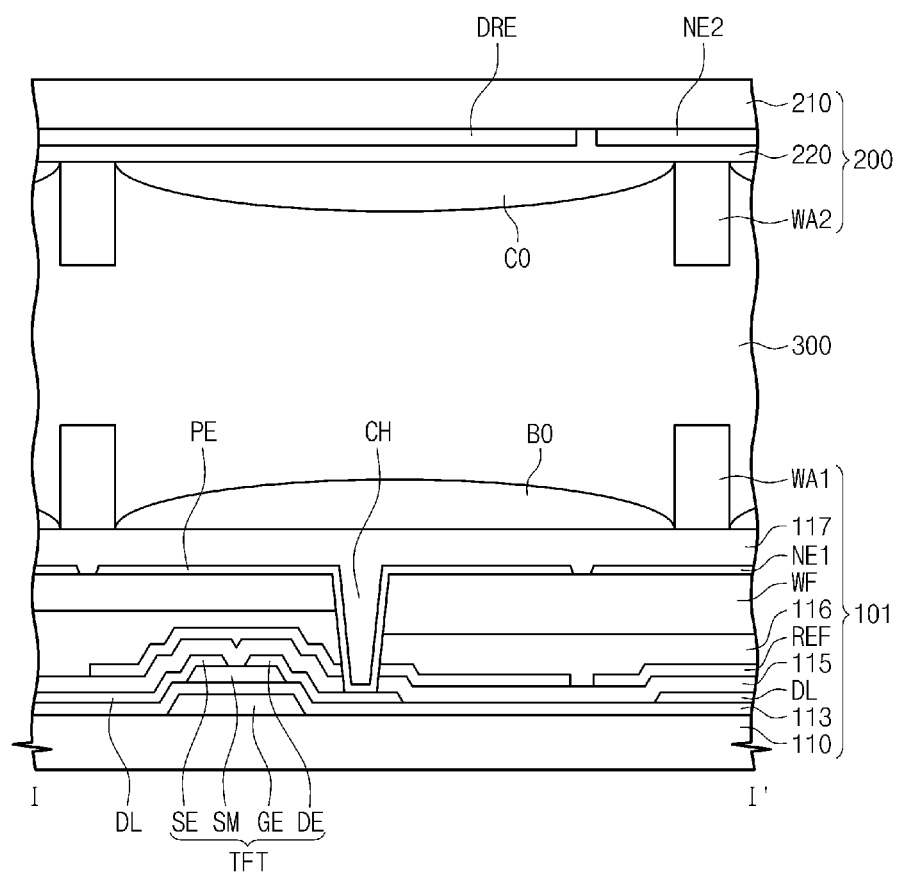
FIG. 14 is a cross-sectional view showing another exemplary embodiment of an electro-wetting display device, according to the present invention.

FIG. 14 is a cross-sectional view showing another exemplary embodiment of an electro-wetting display device, according to the present invention. In the exemplary embodiment of FIG. 14, the same reference numerals denote the same elements in FIG. 13, and thus detailed description of the same elements will be omitted.

The electro-wetting display device includes a first substrate 101, a second substrate 200, and a polar fluid layer 300. In addition, the arrangement of pixel electrodes PE and first notch electrodes NE1 in FIG. 14 is the same as that in FIG. 3, and the arrangement of second notch electrodes NE2 and driving electrode DRE is the same as that in FIG. 4, so that details thereof will be omitted. Further, the first substrate 101 includes a plurality of pixel areas and the pixel areas have the same structure and function, and thus one pixel area will be described in detail with reference to FIG. 14.

Referring to FIG. 14, the pixel area includes a gate line GL, a data line DL, a pixel electrode PE, a reflecting layer REF, a white color filter layer WF, and a thin film transistor TFT, which are disposed on the first substrate 110. The reflecting layer REF is between the first notch electrodes NE1 and the data line DL, whereas in FIGS. 1-12, the first notch electrodes NE1 are between the reflecting layer REF and the data line DL.

In FIG. 14, the reflecting layer REF includes a first sub-reflecting layer disposed on and overlapping the pixel electrode PE, and a second sub-reflecting layer disposed on and overlapping the first notch electrode NE1. The first sub-reflecting layer is spaced apart from the second sub-reflecting layer, and the spacing between the first sub-reflecting layer and the second sub-reflecting layer aligns with the a space between the pixel electrode PE and the first notch electrode NE1.

The reflecting layer REF is directly on the second insulating layer 115 except for the area through which the contact hole CH is formed. The reflecting layer REF may be include a metal material such as aluminum (Al) and is exposed according to a variation of the surface area of the black fluid BO to reflect an external light. When viewed in a plan view, the arrangement of the reflecting layer REF may be the same as that in FIG. 3, but it should not be limited thereto or thereby. That is, the reflecting layer REF may be on entire surface of the second insulating layer 115.

An organic layer 116 is disposed on the second insulating layer 115 on which the reflecting layer REF is disposed, except for the area corresponding to the contact hole CH.

The white color filter layer WF is disposed on the organic layer 116, such that the white color filter layer WF is between the reflecting layer REF and incident external light. In the illustrated exemplary embodiment, the white color filter layer WF may include a photoresist.

The pixel electrodes PE and the first notch electrodes NE1 are disposed on the white color filter layer WF. The first notch electrodes NE1 are spaced apart from the pixel electrodes PE, and the pixel electrodes PE receive the second voltage through the thin film transistor TFT.

When the pixel electrodes PE receive the second voltage having the voltage level different from the first voltage, the voltage difference occurs between the polar fluid layer 300 and the pixel electrodes PE. Accordingly, the black fluid BO is pushed to the area in which the first notch electrode NE1. As a result, the reflecting layer REF and the white color filter layer WF are partially exposed to exterior, the external lights reflected by the exposed reflecting layer REF pass through the white color filter layer WF before being emitted to a viewing side of the display device 10.

According to the above, since the reflected external lights pass through the white color filter layer WF, the lights exiting from the reflecting layer REF represent the white color even though the lights incident to the reflecting layer REF have specific color. Thus, lowering of a brightness of viewed lights may be reduced or effectively prevented due to the color of the incident lights. Especially, the user perceives the lights exiting from the exposed white color filter layer WF as the white color in the black and white mode, and thus the electro-wetting display device may display the images having a uniform display quality without relating to user's environment.

Figure 15:
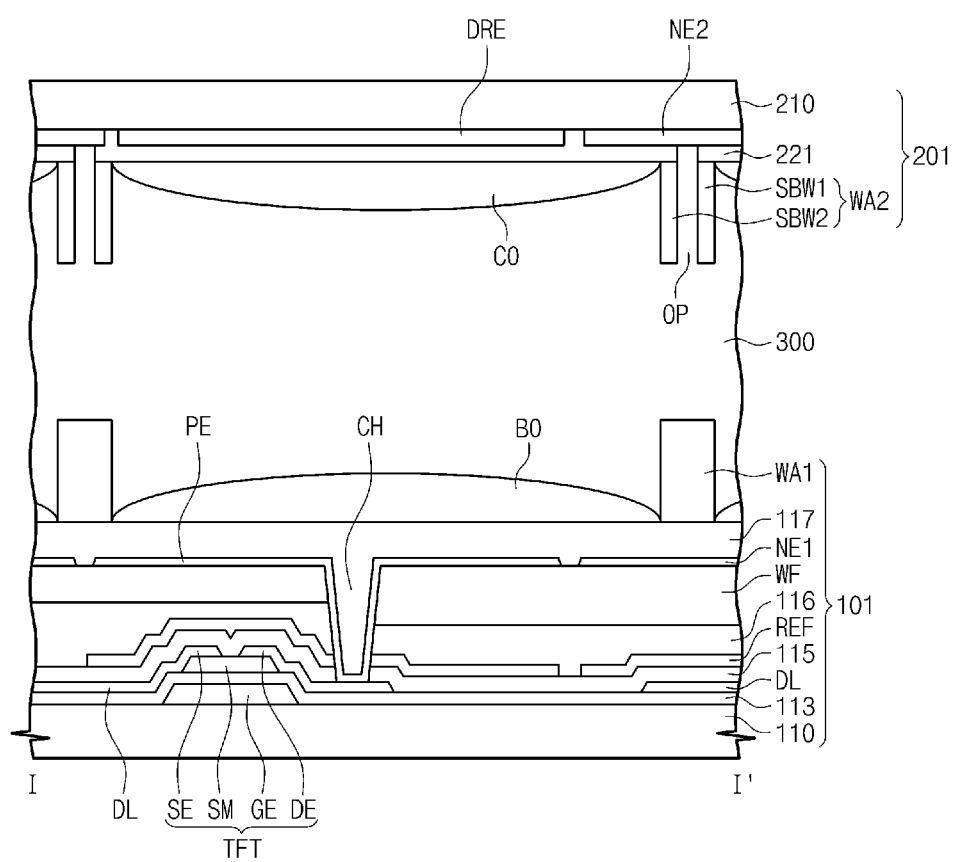
FIG. 15 is a cross-sectional view showing another exemplary embodiment of an electro-wetting display device, according to the present invention.

FIG. 15 is a cross-sectional view showing another exemplary embodiment of an electro-wetting display device, according to the present invention. In the exemplary embodiment of FIG. 15, a first substrate 101 has the same structure and function as the first substrate in FIG. 14, and a second substrate 201 and a polar fluid layer 300 have the same structure and function as the second substrate 201 and the polar fluid layer 300 in FIG. 13. Accordingly, detailed description of the electro-wetting display device in FIG. 15 will be omitted.

In the electro-wetting display device in FIG. 15, the reflected lights pass through the white color filter layer WF, so that the lights exiting from the reflecting layer REF represent the white color, even though the lights incident to the reflecting layer REF have specific color. Accordingly, lowering of the brightness may be reduced or effectively prevented due to the color of the incident lights. Especially, since the user perceives the lights exiting from the exposed white color filter layer WF as the white color in the black and white mode, the electro-wetting display device may display the images having a uniform display quality without relating to user's environment. In addition, since the first voltage is applied to the polar fluid layer 300 through the second notch electrode NE2, no additional electrode is required to apply the voltage to the polar fluid layer 300 according to the forming of the openings OP through the second hydrophobic layer 221. Thus, the manufacturing processes for the electro-wetting display device may be simplified when compared with the electro-wetting display device described in the third exemplary embodiment.

Figure 16:
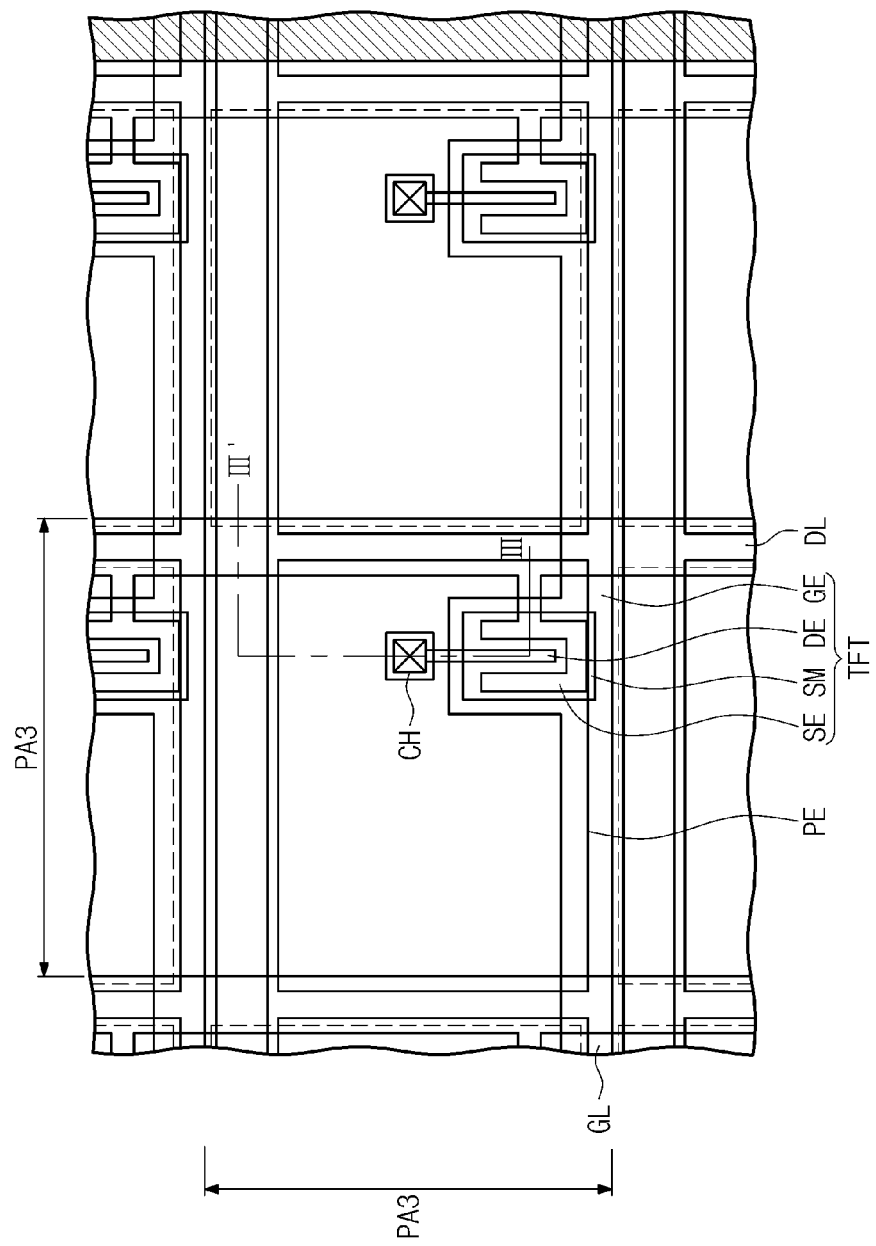
FIG. 16 is a plan view showing another exemplary embodiment of an electro-wetting display device, according to the present invention.
Figure 17:
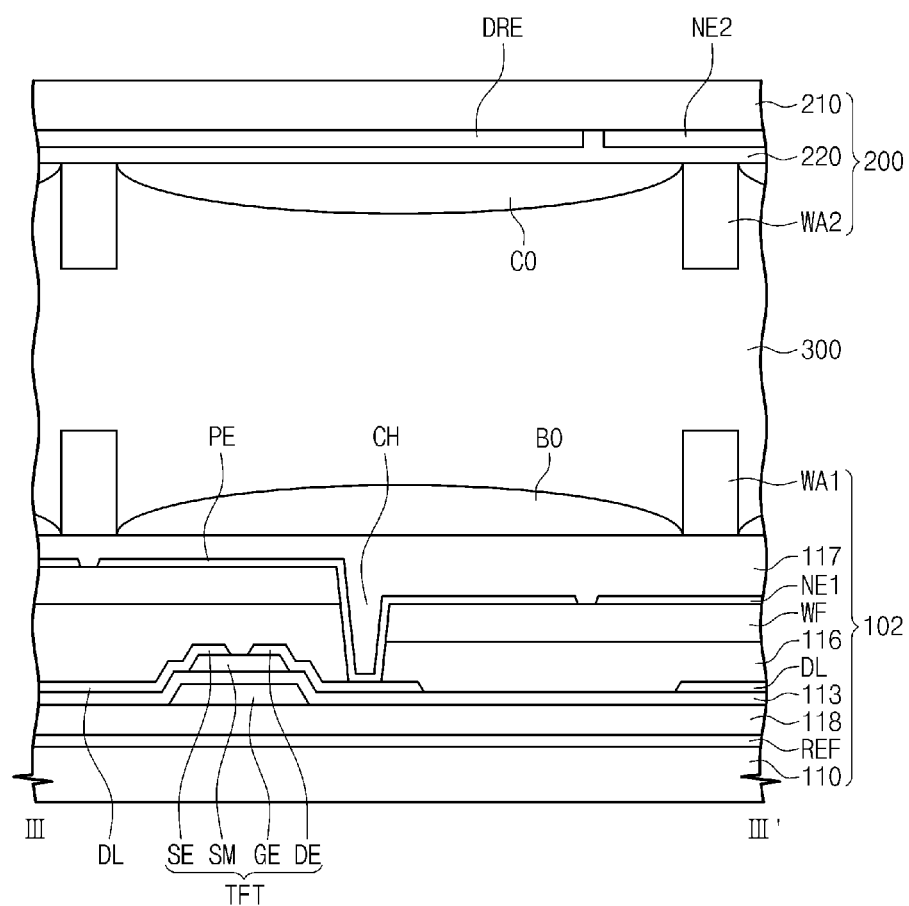
FIG. 17 is a cross-sectional view taken along line III-III' of FIG. 16.

FIG. 16 is a plan view showing another exemplary embodiment of an electro-wetting display device, according to the present invention, and FIG. 17 is a cross-sectional view taken along line III-III' of FIG. 16.

The electro-wetting display device according of FIG. 16 includes a first substrate 102, a second substrate 200, and a polar fluid layer 300. In the exemplary embodiment of FIG. 16, the second substrate 200 and the polar fluid layer 300 have the same structure and function as those of FIGS. 1-12, and thus details thereof will be omitted. In addition, since the first substrate 102 includes a plurality of pixel areas PA3 having the same structure and function, one pixel area PA3 will be described in detail with reference to FIGS. 16 and 17.

Referring to FIGS. 16 and 17, each pixel area PA3 includes a gate line GL, a data line DL, a pixel electrode PE, a reflecting layer REF, and a thin film transistor TFT, which are disposed on the first substrate 110.

The reflecting layer REF is directly on an entire surface of the first substrate 110. The reflecting layer REF reflects the light incident thereto. The reflecting layer REF may include a metal material such as aluminum (Al).

A third insulating layer 118 is directly on the reflecting layer REF. The reflecting layer REF and the gate line GL are electrically insulated from each other by the third insulating layer 118.

The gate line GL extends in the first direction D1, and is disposed on the first substrate 110, and the data line DL extends in the second direction D2 to cross the gate line GL. The gate line GL and the data line DL are insulated from each other by the first insulating layer 113 disposed therebetween.

The thin film transistor TFT has the same structure and function as that shown in FIGS. 5 and 6, so details thereof will be omitted.

The organic layer 116 is on the first insulating layer 113 except for the area corresponding to the contact hole CH. The white color filter layer WF is directly on the organic layer 116.

The pixel electrodes PE and the first notch electrodes NE1 are directly on and contacting the white color filter layer WF, and the pixel electrodes PE are spaced apart from the first notch electrodes NE1.

The first hydrophobic insulating layer 117 is directly on and contacting both the pixel electrodes PE and the first notch electrodes NE1. The first barrier walls WA1 are on the first hydrophobic insulating layer 117, and the black fluid BO is disposed in areas defined by the first barrier walls WA1. The first barrier walls WA1 and the black fluid BO have the same structure and function as the first barrier walls and the black fluid in FIGS. 5 and 6, and thus detailed description of the first barrier walls WA1 and the black fluid BO will be omitted.

According to the above, since the external lights reflected by the reflecting layer REF pass through the white color filter layer WF before being emitted from the display device 10, the lights exiting from the reflecting layer REF represent the white color even though the lights incident to the reflecting layer REF have specific color. Accordingly, lowering of the brightness may be reduced or effectively prevented due to the color of the incident lights. Especially, since the user perceives the lights exiting from the exposed white color filter layer WF as the white color in the black and white mode, the electro-wetting display device may display the images having a uniform display quality without relating to user's environment. In addition, since the reflecting layer REF is on an entire surface of the first substrate 110, no separate process is required in the forming of the reflecting layer REF, thereby simplifying the manufacturing process for the electro-wetting display device.

Figure 18:
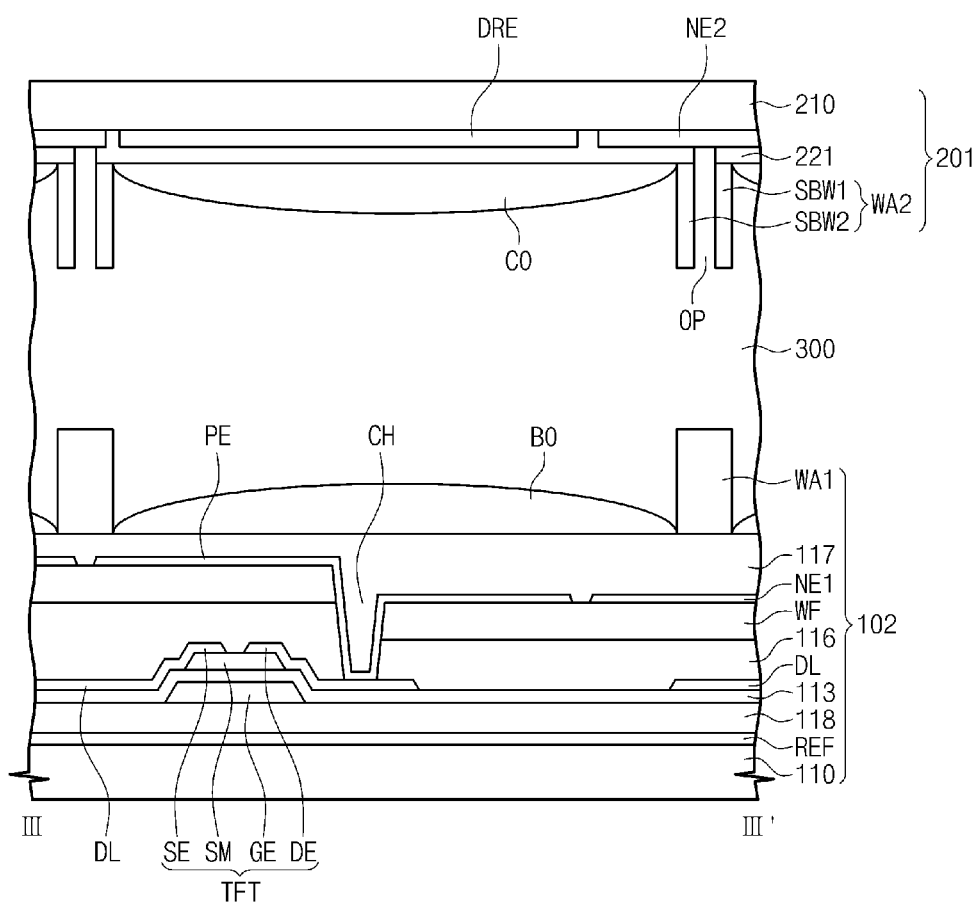
FIG. 18 is a cross-sectional view showing another exemplary embodiment of an electro-wetting display device, according to of the present invention.

FIG. 18 is a cross-sectional view showing another exemplary embodiment of an electro-wetting display device, according to the present invention. In the exemplary embodiment of FIG. 18, a first substrate 102 of the electro-wetting display device has the same structure and function as the first substrate in FIGS. 16 and 17, and a second substrate 201 and a polar fluid layer 300 have the same structure and function as the second substrate and the polar fluid layer in FIGS. 13 and 15. Accordingly, detailed description of the electro-wetting display device according to the exemplary embodiment in FIG. 18 will be omitted.

The electro-wetting display device may display the images having a uniform display quality without relating to user's environment. In addition, since the reflecting layer REF is on an entire surface of the first substrate 110, no separate process is required in the forming of the reflecting layer REF, thereby simplifying the manufacturing process for the electro-wetting display device. Further, the first voltage is directly applied to the polar fluid layer 300 through the second notch electrode NE2, so that no additional electrode is required in the applying of the first voltage to the polar fluid layer 300 due to the openings OP through the second hydrophobic layer 221. Thus, the manufacturing processes for the electro-wetting display device may be simplified when compared with the electro-wetting display device described in the exemplary embodiment of FIG. 14.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electro-wetting display device comprising:
an electrode which receives a first voltage;
a pixel electrode on a first substrate and receiving a second voltage;
a non-polar black fluid on the pixel electrode;
a driving electrode on a second substrate opposite to the first substrate, the driving electrode receiving a third voltage;
a non-polar color fluid on the driving electrode;
a polar fluid layer which is between the non-polar black fluid and the non-polar color fluid, in a cross-sectional thickness direction, and contacts the non-polar black fluid and the non-polar color fluid; and
a hydrophobic insulating layer between the polar fluid layer and the electrode which receives the first voltage, wherein the polar fluid layer contacts the electrode which receives the first voltage.

2. The electro-wetting display device of claim 1, wherein the electrode which receives the first voltage comprises a first notch electrode on the first substrate and spaced apart from the pixel electrode.

3. The electro-wetting display device of claim 2, wherein the electrode which receives the first voltage further comprises a second notch electrode on the second substrate and corresponding to the first notch electrode, wherein the second notch electrode is spaced apart from the driving electrode.

4. The electro-wetting display device of claim 3, further comprising a plurality of pixel areas, wherein each of the pixel electrode, the non-polar black fluid, and the non-polar color fluid is provided in plural numbers, respectively, in the pixel areas.

5. The electro-wetting display device of claim 3, further comprising a connecting portion, wherein the first notch electrode is provided in plural numbers, the first notch electrodes extend in a first direction, and the connecting portion connects ends of the first notch electrodes to each other.

6. The electro-wetting display device of claim 5, wherein each of the second notch electrode and the driving electrode is provided in plural numbers, the second notch electrodes and the driving electrodes are extended in the first direction, and the second notch electrodes and the driving electrodes are alternately arranged in a second direction crossing the first direction.

7. The electro-wetting display device of claim 4, further comprising
 a plurality of first barrier walls on the first substrate at an end portion of each pixel area, and
 a plurality of second barrier walls on the second substrate overlapping the first barrier walls, respectively.

8. The electro-wetting display device of claim 4, wherein each of the non-polar color fluid comprises a red color, a green color, or a blue color.

9. The electro-wetting display device of claim 4, further comprising a plurality of thin film transistors in the pixel areas, respectively, wherein each of the pixel electrodes is connected to a corresponding thin film transistor of the thin film transistors.

10. The electro-wetting display device of claim 3, further comprising a reflecting layer between the non-polar black fluid and the first substrate, wherein the reflecting layer reflects an external incident light.

11. The electro-wetting display device of claim 10, wherein the reflecting layer is between the pixel electrode and the first notch electrode, and between the pixel electrode and the non-polar black fluid.

12. The electro-wetting display device of claim 10, wherein the reflecting layer comprises a first sub-reflecting layer overlapping the pixel electrode, and a second sub-reflecting layer overlapping the first notch electrode, and
 the first sub-reflecting layer is spaced apart from the second sub-reflecting layer.

13. The electro-wetting display device of claim 10, wherein the reflecting layer is between the pixel electrode and the first substrate.

14. The electro-wetting display device of claim 13, further comprising a white color filter layer between the reflecting layer and the pixel electrode.

15. The electro-wetting display device of claim 14, wherein the white color filter layer comprises a photoresist.

16. The electro-wetting display device of claim 3, wherein the electrode which receives the first voltage further comprises a connecting electrode between the first notch electrode and the second notch electrode, wherein the connecting electrode electrically connects the first notch electrode to the second notch electrode.

17. The electro-wetting display device of claim 16, wherein the connecting electrode contact the polar fluid layer, such that the first voltage is applied to the polar fluid layer.

18. The electro-wetting display device of claim 3, wherein the hydrophobic insulating layer is on the second notch electrode and the driving electrode,
 an opening is defined extended through the hydrophobic insulating layer,
 the opening exposes a portion of the second notch electrode, and
 the polar fluid layer directly contacts the exposed portion of the second notch electrode.

19. The electro-wetting display device of claim 1, further comprising:
 a color mode displaying a color according to a voltage level of the third voltage; and
 a black and white mode displaying a black or white color according the voltage level of the third voltage,
 wherein the third voltage has a same voltage level as the first voltage in the color mode.

20. The electro-wetting display device of claim 19, wherein the third voltage level has an off-voltage level in the black and white mode.

* * * * *